(12) United States Patent
Duan et al.

(10) Patent No.: US 8,983,990 B2
(45) Date of Patent: Mar. 17, 2015

(54) ENFORCING QUERY POLICIES OVER RESOURCE DESCRIPTION FRAMEWORK DATA

(75) Inventors: Songyun Duan, Hawthorne, NY (US); Anastasios Kementsietsidis, New York, NY (US); Wangchao Le, Tallahassee, FL (US); Min Wang, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 162 days.

(21) Appl. No.: 12/857,618

(22) Filed: Aug. 17, 2010

(65) Prior Publication Data

US 2012/0047114 A1  Feb. 23, 2012

(51) Int. Cl.
*G06F 7/00* (2006.01)
*G06F 17/30* (2006.01)
*G06F 17/00* (2006.01)

(52) U.S. Cl.
CPC .............................. *G06F 17/30448* (2013.01)
USPC .......................................... 707/759; 707/761

(58) Field of Classification Search
CPC ................... G06F 17/30386; G06F 17/30398; G06F 17/30442
USPC .......... 707/694, 759, 981, 999.001–999.005, 707/761
See application file for complete search history.

(56) References Cited

U.S. PATENT DOCUMENTS

| | | | |
|---|---|---|---|
| 6,523,028 B1 | 2/2003 | DiDomizio et al. | |
| 7,519,599 B2 | 4/2009 | Betz et al. | |
| 2002/0143755 A1 | 10/2002 | Wynblatt et al. | |
| 2002/0194168 A1* | 12/2002 | Min et al. | 707/3 |
| 2004/0122804 A1* | 6/2004 | Zhang et al. | 707/3 |
| 2004/0243613 A1* | 12/2004 | Pourheidari | 707/102 |
| 2005/0065926 A1* | 3/2005 | Chen et al. | 707/4 |
| 2008/0120594 A1 | 5/2008 | Lucas et al. | |
| 2008/0189758 A1* | 8/2008 | Akeel et al. | 726/1 |
| 2008/0256026 A1 | 10/2008 | Hays | |
| 2009/0006316 A1 | 1/2009 | Fan et al. | |
| 2009/0055378 A1 | 2/2009 | Alecu et al. | |
| 2009/0132474 A1 | 5/2009 | Ma et al. | |
| 2009/0182722 A1 | 7/2009 | Coleman | |
| 2009/0234801 A1 | 9/2009 | Moor et al. | |
| 2009/0252319 A1 | 10/2009 | Vesta | |
| 2009/0271179 A1 | 10/2009 | Marchisio et al. | |
| 2009/0292716 A1 | 11/2009 | Oliver et al. | |
| 2009/0300002 A1* | 12/2009 | Thomas et al. | 707/5 |
| 2010/0114885 A1 | 5/2010 | Bowers et al. | |
| 2010/0174682 A1 | 7/2010 | Alstrin et al. | |
| 2010/0241644 A1* | 9/2010 | Jackson et al. | 707/760 |
| 2010/0268722 A1* | 10/2010 | Yalamanchi et al. | 707/759 |
| 2010/0332217 A1 | 12/2010 | Wintner et al. | |

OTHER PUBLICATIONS

IBM (Mar. 16, 2009). A System and Method for Efficient RDF Query Processing. IP.com: IPCOM000180721D, pp. 1-5.

(Continued)

*Primary Examiner* — Kannan Shanmugasundaram (74) *Attorney, Agent, or Firm* — Cantor Colburn LLP; Nidhi Garg (57) ABSTRACT

A method of performing a graph query issued by a user is provided. The method includes performing on a processor, receiving a user graph query. The method includes rewriting the user graph query as a new query based on a query policy expressed in a graph query language. The method includes performing the new query on graph data to obtain a result.

6 Claims, 6 Drawing Sheets

(56) References Cited

OTHER PUBLICATIONS

Kim, J. et al (Apr. 7-12, 2008). An RDF triple based access authorization specification considering subsumption relationships. IEEE, ICDE Workshop 2008, pp. 462-469.

Correndo, G. et al. (Mar. 22-26, 2010). SPARQL Query Rewriting for Implementing Data Integration over Linked Data. EDBT 2010. pp. 1-11.

Faisal Alkhateeb et al., Extending SPARQL with Regular Expression Patterns (for Querying RDF) *, Journal Article, Elsevier Science, Jul. 22, 2008, pp. 1-48, France.

Wangchao Le et al., RDF Access Control: Query rewriting over SPARQL security views, Journal Article, VLDB Endowment, 2010, pp. 1-11, Singapore.

* cited by examiner

FIG. 1

| Subject | Predicate | Object |
|---|---|---|
| Person0 | Friend | Person1 |
| Person1 | Friend | Person2 |
| Person2 | Friend | Person5 |
| Person0 | Relative | Person3 |
| Person0 | Workswith | Person4 |
| Person0 | Name | "Eric" |
| Person0 | Lives | NYC |
| Person1 | Name | "Jim" |
| Person1 | Lives | LA |
| Person2 | Name | "Stan" |
| Person2 | Lives | NYC |
| Person3 | Name | "David" |
| Person3 | Lives | NYC |
| Person4 | Name | "Tim" |
| Person4 | Lives | CHI |
| Person5 | Name | "Kyle" |
| Person5 | Lives | LA |

FIG. 2A

Query Policy: A user can only see info of friends, relatives, and friends of friends.

FIG. 2B

| Subject | Predicate | Object |
|---------|-----------|--------|
| Person0 | Friend | Person1 |
| Person1 | Friend | Person2 |
| Person0 | Relative | Person3 |
| Person1 | Name | "Jim" |
| Person1 | Lives | LA |
| Person2 | Name | "Stan" |
| Person2 | Lives | NYC |
| Person3 | Name | "David" |
| Person3 | Lives | NYC |

FIG. 2C

$V_f$: CONSTRUCT { ?f0 friend ?f1, ?f1 name ?n1, ?f1 lives ?l1 }
WHERE { ?f0 name <P>, ?f0 friend ?f1, ?f1 name ?n1, ?f1 lives ?l1 }

$V_{fof}$: CONSTRUCT { ?f2 friend ?f4, ?f4 name ?n4, ?f4 lives ?l4 }
WHERE { ?f2 name <P>, ?f3 friend ?f4, ?f4 name ?n4, ?f4 lives ?l4 }

$V_r$: CONSTRUCT { ?r0 relative ?r1, ?r1 name ?n1, ?r1 lives ?l1 }
WHERE { ?r0 name <P>, ?r0 relative ?r1, ?r1 name ?n1, ?r1 lives ?l1 }

FIG. 2D

User Query (Qu): *"Show me my friends or relatives who live in the same city"*

FIG. 2E

Q: SELECT {?f5, ?r5, ?l5}
WHERE {person0 friend ?f5, ?f5 lives ?l5, person0 related ?r5, ?r5 lives ?l5}

ENFORCING QUERY POLICIES OVER RESOURCE DESCRIPTION FRAMEWORK DATA

STATEMENT REGARDING FEDERALLY SPONSORED RESEARCH OR DEVELOPMENT

This invention was made with U.S. Government support under Contract No. W911NF-09-2-0053 awarded by the U.S. Army. The U.S. Government has certain rights in the invention.

BACKGROUND

The present invention relates to query systems and methods, and more specifically, to query systems and methods for Resource Description Framework data.

Resource Description Framework (RDF) is a data representation standard of the Internet. Secure access of RDF data can be dictated by policies. Such policies can include, for example, simple policies that ensure the privacy of users (e.g., in sites like Facebook and LinkedIn), complex policies that enforce complex security clearance protocols in enterprise and military settings, or any other policy. Secure access control solutions for both relational and extensive markup language (XML) data exist. However, such solutions prove to be ineffective for RDF data.

SUMMARY

According to one embodiment of the present invention, a method of performing a graph query issued by a user is provided. The method includes performing on a processor, receiving a user graph query; rewriting the user graph query as a new query based on a query policy expressed in a graph query language; and performing the new query on graph data to obtain a result.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features and advantages of the invention are apparent from the following detailed description taken in conjunction with the accompanying drawings in which:

DETAILED DESCRIPTION

Figure 1:
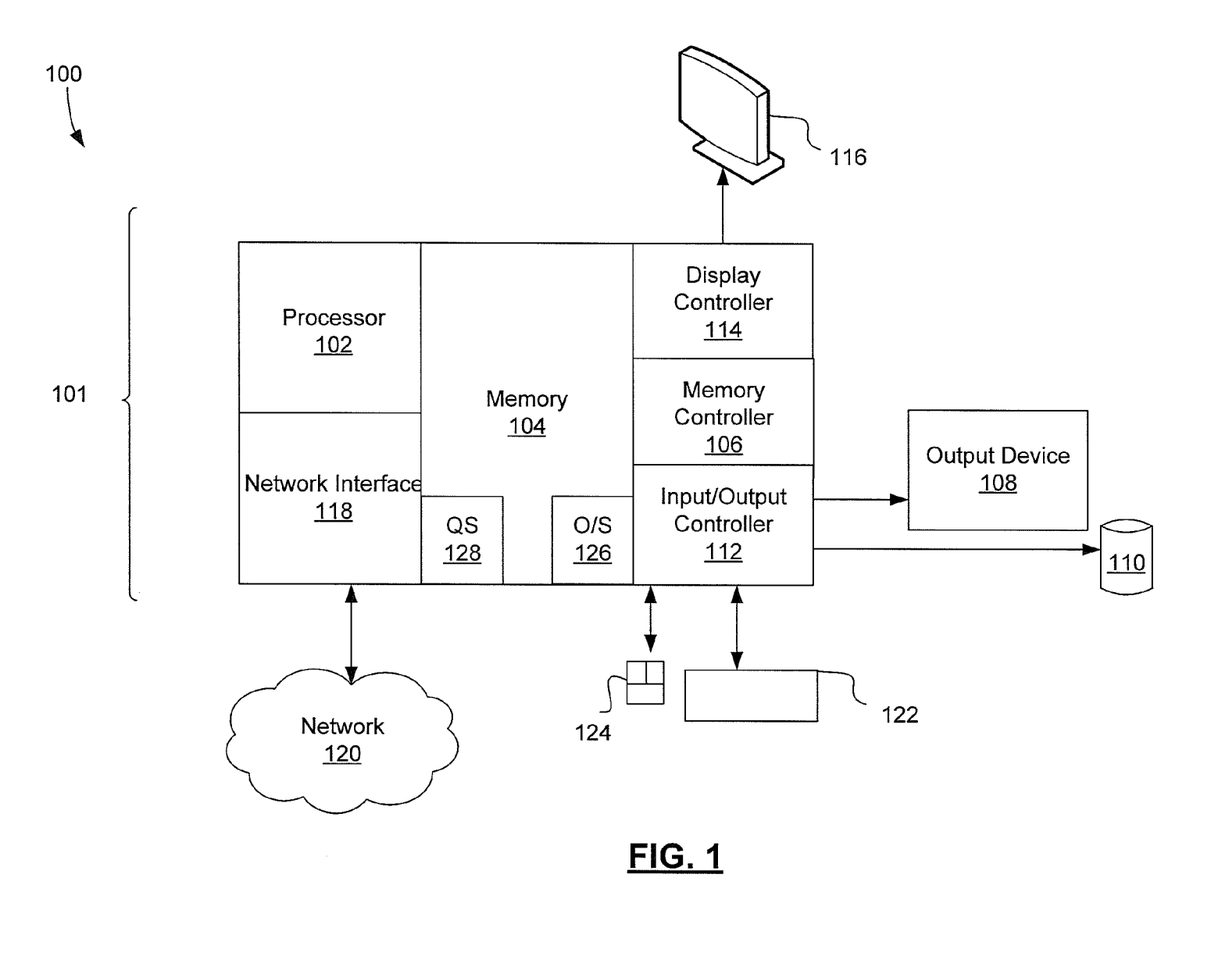
FIG. 1 is an illustration of a computing system that includes a query system in accordance with exemplary embodiments.

Turning now to the drawings in greater detail, it will be seen that in FIG. 1 an exemplary computing system 100 includes a query system in accordance with the present disclosure. The computing system 100 is shown to include a computer 101. As can be appreciated, the computing system 100 can include any computing device, including but not limited to, a desktop computer, a laptop, a server, a portable handheld device, or any other electronic device that includes a memory and a processor. For ease of the discussion, the disclosure will be discussed in the context of the computer 101.

The computer 101 is shown to include a processor 102, memory 104 coupled to a memory controller 106, one or more input and/or output (I/O) devices 108, 110 (or peripherals) that are communicatively coupled via a local input/output controller 112, and a display controller 114 coupled to a display 116. In an exemplary embodiment, a conventional keyboard 122 and mouse 124 can be coupled to the input/output controller 112. In an exemplary embodiment, the computing system 100 can further include a network interface 118 for coupling to a network 120. The network 120 transmits and receives data between the computer 101 and external systems.

In various embodiments, the memory 104 stores instructions that can be performed by the processor 102. The instructions stored in memory 104 may include one or more separate programs, each of which comprises an ordered listing of executable instructions for implementing logical functions. In the example of FIG. 1, the instructions stored in the memory 104 include a suitable operating system (OS) 126. The operating system 126 essentially controls the performance of other computer programs and provides scheduling, input-output control, file and data management, memory management, and communication control and related services.

When the computer 101 is in operation, the processor 102 is configured to execute the instructions stored within the memory 104, to communicate data to and from the memory 104, and to generally control operations of the computer 101 pursuant to the instructions. The processor 102 can be any custom made or commercially available processor, a central processing unit (CPU), an auxiliary processor among several processors associated with the computer 101, a semiconductor based microprocessor (in the form of a microchip or chip set), a macroprocessor, or generally any device for executing instructions.

The processor 102 executes the instructions of a query system (QS) 128 of the present disclosure. In various embodiments, the query system 128 of the present disclosure is stored in the memory 104 (as shown), is run from a portable storage device (e.g., CD-ROM, Diskette, FlashDrive, etc.) (not shown), and/or is run from a remote location, such as from a central server (not shown).

Generally speaking, the query system 128 performs queries on data stored in, for example, the memory 104 or other data storage medium. The query system 128 performs the queries based on a defined query policy. For example, the query system 128 generates a new query that is a join of the initial query and the query policy. The new query is then used to query the data. Technical effects and benefits of this query process include more efficient query results as well as faster query response times. Further details are shown with reference to FIG. 3

With reference now to FIGS. 2A-2F, data associated with a social networking site is shown and described. Such data is provided for exemplary purposes. As can be appreciated, the query system 128 of the present disclosure is applicable to various types of data and is not limited to the present example.

Figure 2A:
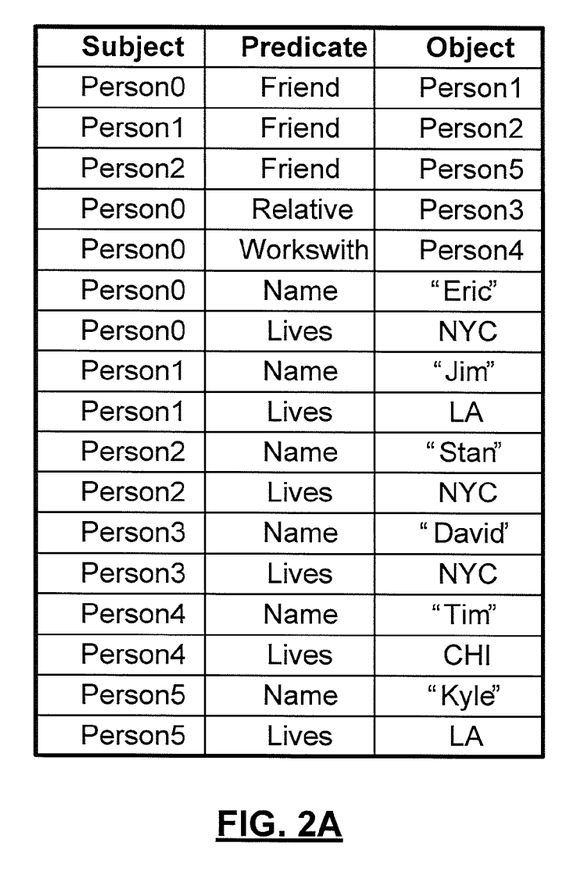
FIGS. 2A-2F illustrate exemplary data of the query system in accordance with exemplary embodiments.

In the provided example, the social networking data can describe user acquaintances, such as friend, related, works (with), and the like. Resource Description Framework (RDF) triples are often used to model these types of user acquaintances. RDF triples include a subject, a predicate, and an object, where the subject denotes the resource, and the predicate denotes traits or aspects of the resource and expresses a relationship between the subject and the object. A collection of RDF triples represents a directed graph. A sample of RDF triples is shown in FIG. 2A.

In social networking sites, secure access control allows users to expose only a subset of their social network. Such access is enforced through a query policy. For example, a user (say, person0) might expose to the user's friends only the user's immediate friends (person1 and person2) and relatives (person3), but not the user's co-workers (person4). Furthermore, the user might also expose the user's friends-of-friends (FoF) and relatives-of-relatives (RoR) (but not the relatives-of-friends, or the friends-of-relatives).

Figure 2B:
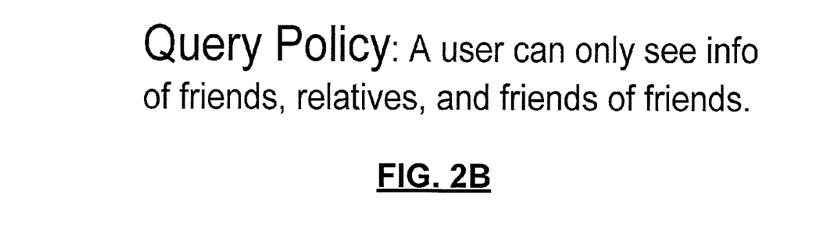
Figure 2C:
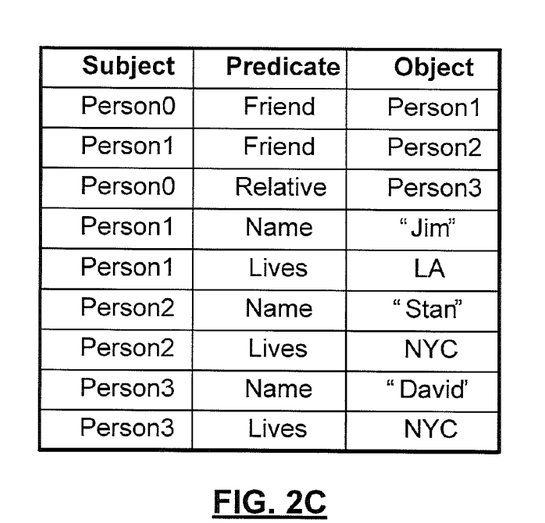
Figure 2D:
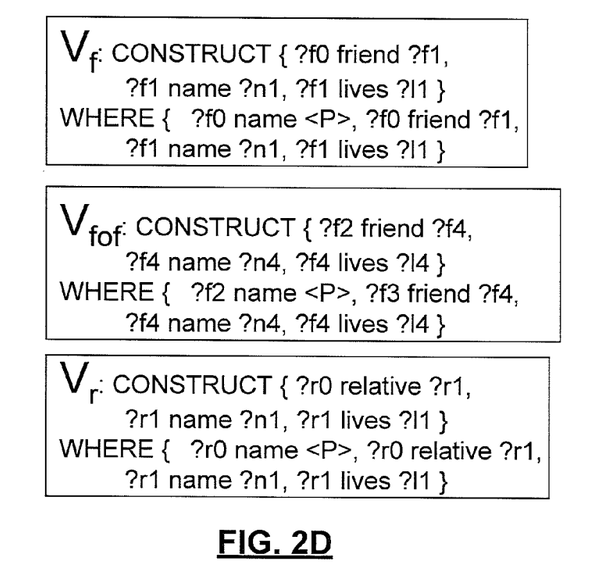
Figure 2E:
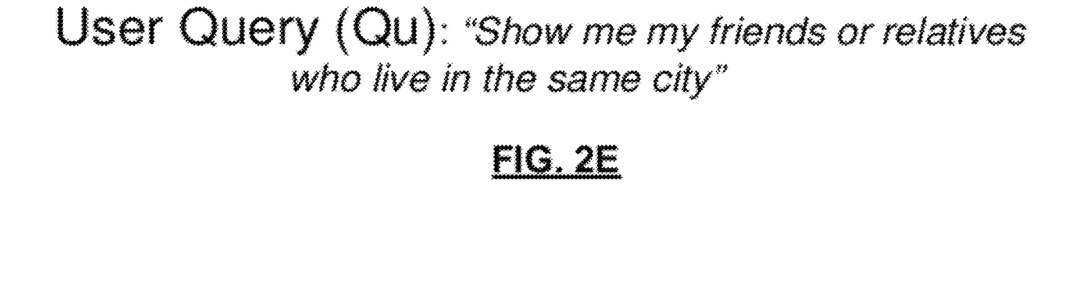
Figure 2F:
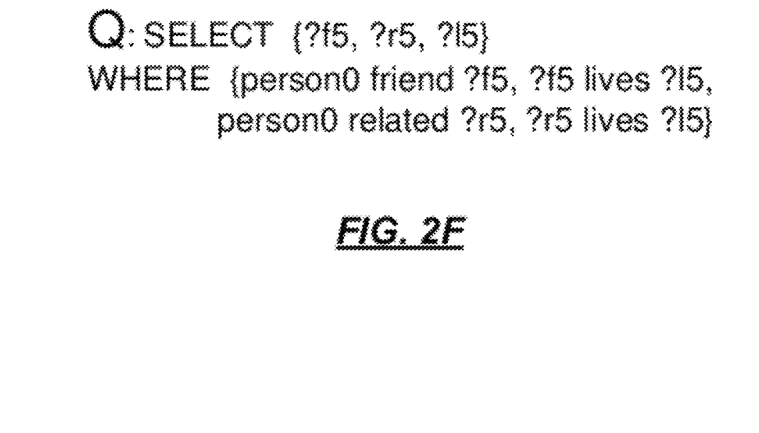

FIG. 2B shows an exemplary query policy indicating an exposure rule in plain English. FIG. 2C shows the data that can be accessed for user "Eric" provided the query policy of FIG. 2B. FIG. 2D shows views that can be used to enforce the query policy of FIG. 2B. In various embodiments, the views are the query policy expressed in a graph query language. The graph query language may include, but is not limited to, SPARQL (SPARQL Protocol and RDF Query Language), RDQL (RDF Data Query Language), RQL (RDF Query Language), etc. In the example of FIG. 2D, the variables are prefixed by "?". The person for which the policies are enforced are indicated as a parameter Pi. Notice that the views hide any distinction between the immediate friends (or relatives) and those at a distance of two. FIG. 2E shows an exemplary user query initiated in plain English, and FIG. 2F shows the user query of FIG. 2E expressed a graph query language. According to various embodiments of the present disclosure, the views V are used to rewrite the user query Q into a new query Q' over the base data.

Figure 3:
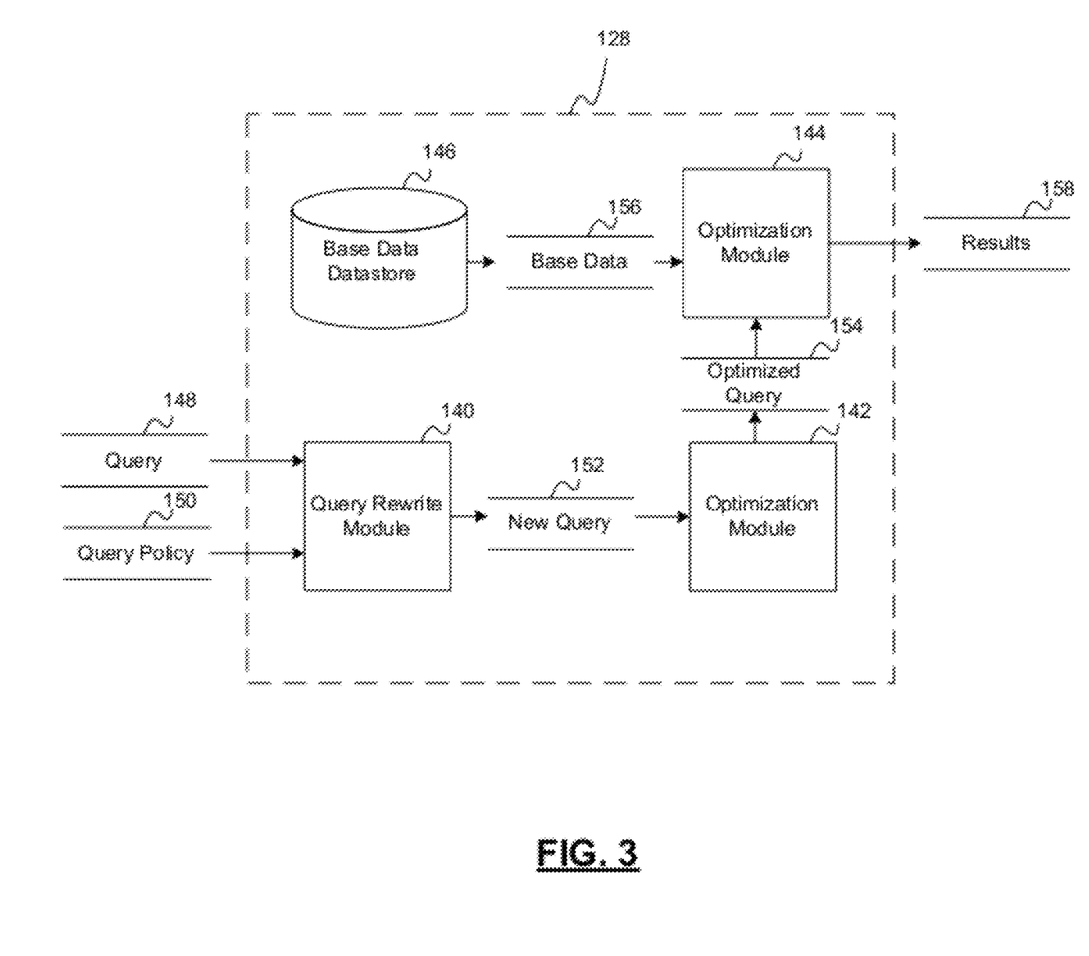
FIG. 3 is a dataflow diagram that illustrates a query system in accordance with exemplary embodiments.

Turning now to FIG. 3, the query system 128 is shown in more detail in accordance with exemplary embodiments. The query system 128 can include one or more sub-modules and datastores. As can be appreciated, the sub-modules can be implemented as software, hardware, firmware, a combination thereof, and/or other suitable components that provide the described functionality. As can further be appreciated, the sub-modules shown in FIG. 3 can be combined and/or further partitioned to similarly perform a query. In various embodiments, the query system 128 includes a query rewrite module 140, an optimization module 142, a query module 144, and a base data datastore 146.

The query rewrite module 140 receives as input a user query 148 and a query policy 150. In various embodiments, the query policy 150 can be predefined and stored in a query policy datastore (not shown). In various other embodiments, the query policy 150 is received and the query rewrite module 140 translates the query policy 150 to a graph query language. As illustrated in FIG. 2D, the query policy 150 can be expressed in a graph query language (e.g., SPARQL, RDQL, RQL, etc.) and can include one or more views that define how the data can be accessed. Similarly, the user query 148 can be expressed in a graph query language. In various embodiments, the user query 148 can be received and translated to a query language by the query rewrite module 140.

Based on the user query 148 and the query policy 150, the query rewrite module 140 generates a new query 152. For example, the query rewrite module 140 determines which views can be used from the query policy 150 in the rewriting process. If the user query 148 and the query policy 150 are provided in the same graph query language, such as SPARQL, it is determined whether a variable mapping exists between a triple pattern in the head of a view and one of the triple patterns in the user query 156. If such variable mapping exists, then the view is included in the subset of views that is used to rewrite the user query 148.

In various embodiments, computing variable mappings is similar to computing substitutions between conjunctive queries, that is, mappings from constants to constants, and from variables to variables and constants. The variable mappings are computed between patterns in the query and the view that have the same constant predicate (note that variable predicates are replaced by constants).

If, however, the user query 148 and the query policy 150 are provided in different graph query languages, they can both be converted into equivalent query graphs and then the mappings can be computed between the nodes and edges of the corresponding graphs.

The query rewrite module 140 then constructs the new query 152 as a union of conjunctive queries. Each query in the union is a result of considering one combination from the Cartesian product of the view set. While considering each combination, the query rewrite module 140 ensures that the corresponding variable mappings from individual predicates do not conflict (i.e., they do not map the same variable in the query Q to two different constants from the views). For each non-conflicting combination, the query rewrite module 140 generates one query in the union.

The optimization module 142 receives as input the new query 152 from the query rewrite module 140. The optimization module 142 performs one or more optimization techniques on the new query 152 to ensure that the new query 152 is secure, sound, and complete and generates an optimized query 154.

For example, provided an RDF graph G, a set of access control policies Pi=IF CONTEXTi GRANT Vi ($1 \leq i \leq n$), and a user U, the rewriting is secure if the evaluation of query Q'(G) only accesses triples that are also accessed by Vu (i.e., $GP(Q')(G) \subseteq Ui((GP(Vi)(G)), Vi \in Vu)$. The rewriting is sound, for example, if Q'(G) is contained in Q(Vu(G)) (i.e., $Q'(G) \subseteq Q(Vu(G))$). The rewriting is complete, for example, if Q(Vu(G)) is contained in Q'(G) (i.e., $Q(Vu(G)) \subseteq Q'(G)$). Soundness and completeness suffice to show that Q(Vu(G))=Q'(G). Security provides the additional guarantee that the rewriting does not touch data that would otherwise be inaccessible to user U.

In various embodiments, the optimization techniques can include, for example, but are not limited to, redundancy removal, empty query removal, and sub-query optimization. The optimization techniques can be based on, for example, the optimization techniques as described in the U.S Patent Application filed contemporaneously herewith entitled, "Database Query Optimizations," which is incorporated herein by reference in its entirety.

The redundancy removal technique removes redundant views from the new query 152. For example, assume that a view V is used twice in the new query 152, once for predicate p1 and once for its joinable predicate p2, with variable mappings $\Phi_1$ and $\Phi_2$, respectively. The optimization module 142 considers the variable mappings between the query and the views and attempts to construct a new mapping Φ merge that merges the two input mappings.

In various embodiments, the variables and constants appearing in the new query 152 are treated as constants for the purpose of this merging (therefore only fresh variables are treated as variables for the purposes of the merging). This ensures that views are merged not just because they are copies of each other, but merged only when their predicates are joined in the same way as in the query itself. Each time view copies are merged, any variable mappings that have been applied to the views are accounted for, due to their relationship with other views corresponding to the other predicates. If Φ merge is equal to Ø, then the two copies of V can not be merged.

The empty query removal technique removes any empty views from the new query 152. For example, a value set for each distinct variable involved in the views is determined, and a synopsis for each value set is then constructed. Given these synopses, for the previous example, the size of the intersection of A(?y2) and A(?y3) is estimated. If the intersection size is estimated to be above some preset threshold with a reasonable probability, they can be considered as joinable. Otherwise, an ASK query can be issued to verify if the view is actually empty. If the ask query returns 'yes', the rewritings that involve V1 and V2 for the joined triple patterns of p1(?y1, ?y2) and p2(?y3, ?y4) are removed.

The sub-query optimization technique removes empty sub-queries of the new query 152. In various embodiments, the sub-query optimization technique can be performed during the rewrite process. For example, a structure STACK can be used where each element in the structure STACK stores a sub-query SubQ of Q along with a candidate view combination for rewriting SubQ. Initially, STACK and SubQ are empty. The first sub-query considered corresponds to a pattern in Q, and the pattern with the smallest size of |CandV| is picked. Intuitively, this pattern is the most selective. By considering the most selective predicates in order (in terms of their |CandV|), the effects of early termination of a branch of rewritings once we detect the rewriting for SubQ results in an empty set are maximized (i.e., a larger portion of the rewritings for Q that contain this rewriting for SubQ is pruned earlier in this manner).

After the first pattern, one pattern added is considered at each step. The way the pattern is picked ensures that it can be joined with the current SubQ at the head of STACK, which increases the chance of optimization with the other techniques described above. When more than one pattern is under consideration, the most selective one is picked. After a pattern is added and a candidate view for the pattern is picked, if the view is redundant with the existing view set for SubQ, it is merged into the view set. If the current rewriting for SubQ has an empty result, the rewriting is not extended further and not pushed back into STACK.

The query module 144 receives as input the optimized query 154. The query module 144 performs a query of base data 156 stored in the base data datastore 146 based on the optimized query 154. The query module 144 generates query results 158 from the query. The query results 158 can be presented to the user via, for example, a user interface in a textual or graphical format.

Figure 4:
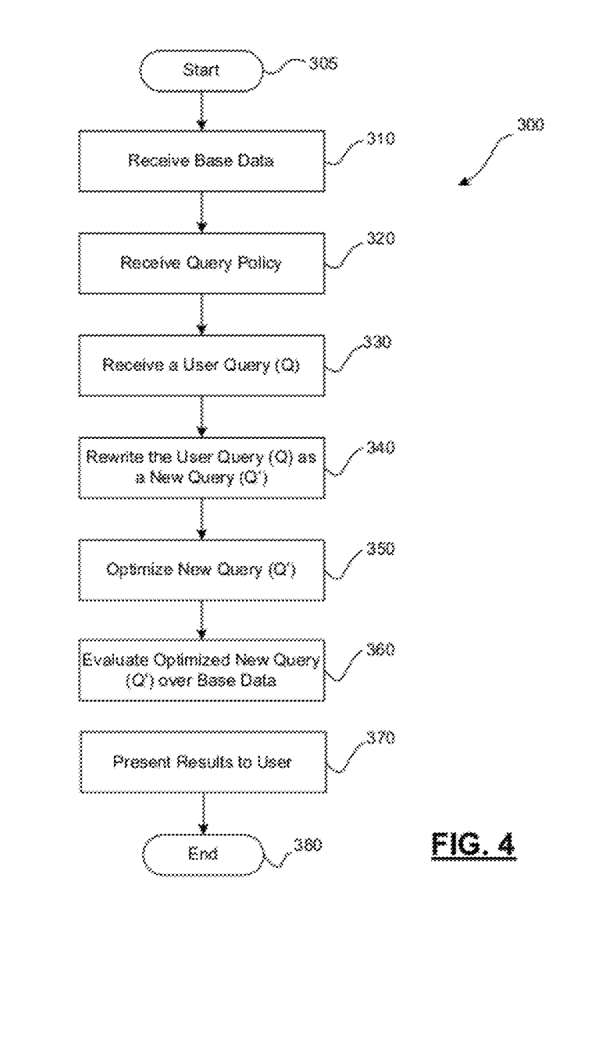
FIGS. 4 and 5 are flowcharts illustrating query methods of the query system in accordance with exemplary embodiments.
Figure 5:
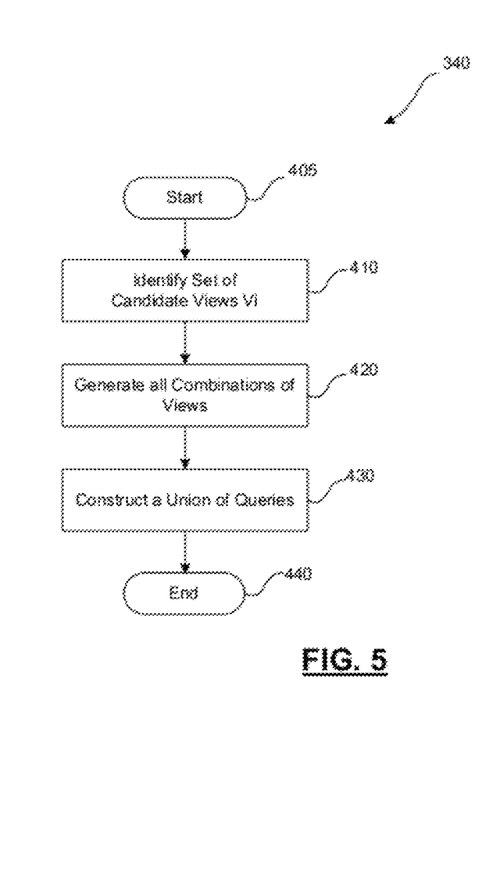

Turning now to FIGS. 4 and 5 and with continued reference to FIG. 3, flowcharts illustrate query methods that can be performed by the query system 128 in accordance with exemplary embodiments. As can be appreciated in light of the disclosure, the order of operation within the methods is not limited to the sequential performance as illustrated in FIGS. 4 and 5, but may be performed in one or more varying orders as applicable and in accordance with the present disclosure. As can be appreciated, one or more steps can be added or deleted from the method without altering the spirit of the method.

With particular reference to FIG. 4, a high level query method 300 is illustrated. In one example, the method may begin at 305. The base data 156 is received and stored at 310. The query policy data 150 is received and stored at 320. The user query 148 is received at 330. The user query 148 is rewritten based on the query policy data 150 at 340 as discussed above and the new query 152 is generated. The new query 152 is optimized at 350 as discussed above. The optimized query 154 is then used to evaluate the base data 156 at 360. The results 158 of the evaluation are provided to a user at 370. The method may end at 380.

With particular reference to FIG. 5, the query rewrite step at 340 of FIG. 4 is further illustrated. In one example, the method may begin at 405. The candidate set of views is identified at 410 as discussed above and shown for example in FIG. 2D. The combinations of views are generated at 420 and the union of queries is constructed at 430 as discussed above. Thereafter, the method may end at 440.

As can be appreciated, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method of performing a graph query issued by a user, comprising:
    performing on a processor,
    receiving a user graph query, the user graph query being user generated;
    creating a new query based on the user graph query and a query policy expressed in a graph query language, the query policy being expressed as a set of one or more views, where each view includes a first query that evaluates whether the query policy applies to the user and a second query that determines graph data that is viewable to the user through the view, wherein the new query comprises a union of conjunctive queries wherein each query in the union is a result of considering one combination from a Cartesian product of
    creating an optimized query by removing redundant views from the new query, removing any empty views from the new query, and removing any empty sub-query of the new query; and
    performing the optimized query on graph data to obtain a result, wherein the graph data includes a set of triples,
    wherein the rewriting further comprises:
    identifying a plurality of views in the query policy;
    separating the plurality of views into groups based on a query predicate;
    considering one view from each of the groups as a rewritten query based on a query predicate;
    checking a validity of the rewritten query; and
    generating the new query based on a union of the rewritten queries.

2. The method of claim 1 wherein the graph query language is at least one of SPARQL, RDQL, and RQL.

3. A system for performing a query, the system comprising:
a non-transitory computer readable medium that includes:
  a query rewrite module that receives a user graph query and that rewrites the user graph query as a new query based on a query policy expressed in a graph query language, the user graph query being user generated, the query policy being expressed as a set of one or more views, where each view includes a first query that evaluates whether the query policy applies to the user and a second query that determines graph data that is viewable to the user through the view, wherein the new query comprises a union of conjunctive queries wherein each query in the union is a result of considering one combination from a Cartesian product of the user graph query and the set of one or more views;
  the query rewrite module further configured to create an optimized query by removing redundant views from the new query, removing any empty views from the new query, and removing any empty sub-query of the new query; and
  a query module that performs the optimized query on a graph data to obtain a result, wherein the graph data includes a set of triples,
wherein the query rewrite module rewrites the user query by:
identifying a plurality of views in the query policy;
separating the plurality of views into groups based on a query predicate;
considering one view from each of the groups as a rewritten query based on a query predicate; and
generating the new query based on a union of the rewritten queries.

4. The system of claim 3 wherein the graph query language is at least one of SPARQL, RDQL, and RQL.

5. A computer program product for performing a query issued by a user, the computer program product comprising:
  a non-transitory storage medium readable by a processing circuit and storing instructions for execution by the processing circuit for performing a method comprising:
    receiving a user graph query, the user graph query being user generated;
    creating a new query based on the user graph query and a query policy expressed in a graph query language, the query policy being expressed as a set of one or more views, where each view includes a first query that evaluates whether the query policy applies to the user and a second query that determines graph data that is viewable to the user through the view, wherein the new query comprises a union of conjunctive queries wherein each query in the union is a result of considering one combination from a Cartesian product of the user graph query and the set of one or more views;
    creating an optimized query by removing redundant views from the new query, removing any empty views from the new query, and removing any empty sub-query of the new query; and
    performing the optimized query on a graph data to obtain a result, wherein the graph data includes a set of triples,
  wherein the query rewrite module rewrites the user query by:
  identifying a plurality of views in the query policy;
  separating the plurality of views into groups based on a query predicate;
  considering one view from each of the groups as a rewritten query based on a query predicate; and
  generating the new query based on a union of the rewritten queries.

6. The computer program product of claim 5 wherein the graph query language is at least one of SPARQL, RDQL, and RQL.

* * * * *